(12) United States Patent
Saraf et al.

(10) Patent No.: US 10,757,124 B2
(45) Date of Patent: Aug. 25, 2020

(54) ANOMALY DETECTION ASSOCIATED WITH COMMUNITIES

(71) Applicant: GUAVUS, INC., San Jose, CA (US)

(72) Inventors: Atul Saraf, Noida (IN); Pankaj Kumar, Haryana (IN); Ankit Bhardwaj, Delhi (IN)

(73) Assignee: GUAVUS, INC., San Mateo, CA (US)

( * ) Notice: Subject to any disclaimer, the term of this patent is extended or adjusted under 35 U.S.C. 154(b) by 222 days.

(21) Appl. No.: 15/990,631

(22) Filed: May 26, 2018

(65) Prior Publication Data

US 2019/0364065 A1 Nov. 28, 2019

(51) Int. Cl.
*H04L 29/06* (2006.01)

(52) U.S. Cl.
CPC .................. *H04L 63/1425* (2013.01)

(58) Field of Classification Search
CPC .................................................. H04L 63/1425
See application file for complete search history.

(56) References Cited

U.S. PATENT DOCUMENTS

| | | | | |
|---|---|---|---|---|
| 9,183,387 B1 * | 11/2015 | Altman | .................. | G06F 21/554 |
| 10,015,182 B1 * | 7/2018 | Shintre | .................. | H04L 63/10 |
| 10,417,299 B1 * | 9/2019 | Terleski | .................. | G06Q 50/01 |
| 2003/0097439 A1 * | 5/2003 | Strayer | .................. | H04L 51/34 |
| | | | | 709/224 |
| 2013/0054604 A1 * | 2/2013 | Boldyrev | .............. | G06F 16/285 |
| | | | | 707/739 |
| 2013/0117812 A1 * | 5/2013 | Ponchel | ................. | G06F 21/552 |
| | | | | 726/1 |
| 2013/0198811 A1 * | 8/2013 | Yu | .......................... | H04L 63/104 |
| | | | | 726/4 |
| 2014/0195931 A1 * | 7/2014 | Kwon | ..................... | G06Q 30/02 |
| | | | | 715/753 |
| 2017/0076256 A1 * | 3/2017 | Castel | ..................... | G06Q 10/20 |
| 2017/0322959 A1 * | 11/2017 | Tidwell | .................. | G06F 21/554 |
| 2018/0032386 A1 * | 2/2018 | DeChiaro | ............... | C07K 7/08 |
| 2018/0103052 A1 * | 4/2018 | Choudhury | ......... | H04L 63/1425 |
| 2019/0188065 A1 * | 6/2019 | Anghel | .................. | G06N 7/005 |
| 2019/0303771 A1 * | 10/2019 | Soong | ...................... | G06N 5/04 |
| 2019/0303838 A1 * | 10/2019 | Chung | .................. | G06F 16/256 |
| 2019/0362278 A1 * | 11/2019 | Saraf | ................. | G06Q 10/06316 |
| 2020/0050758 A1 * | 2/2020 | Fullinwider | .......... | G06F 16/437 |

* cited by examiner

*Primary Examiner* — Sarah Su
(74) *Attorney, Agent, or Firm* — Kerr IP Group, LLC (57) ABSTRACT

A system and method for detecting unauthorized access to a plurality of network assets is described. The system and method receive a network asset feed from a plurality of data sources and then generating at least one social graph with the network asset feed. User communities are identified with the social graph and user accounts are associated with user communities. Commonly accessed network assets are identified from a firewall log, a router log or the combination thereof. A derived community is identified based on the user accounts associated with commonly accessed network assets. The systems and methods monitor communications associated with the user community so that the communications correspond to the derived community, and then reports an anomalous communication when the user community communications do not correspond to the derived community.

17 Claims, 5 Drawing Sheets

ANOMALY DETECTION ASSOCIATED WITH COMMUNITIES

FIELD

The description generally relates to detecting unauthorized access to network assets based on anomaly detection associated with communities. More particularly, the description relates to detecting unauthorized access based on anomaly detection associated with a user community, a derived community or the combination thereof.

BACKGROUND

Networks and information systems are deployed in corporations, government, and healthcare. These network and information systems communicate confidential and proprietary information. The amount of confidential and proprietary information being collected by institutions and organizations is growing at an exponential rate, which is a challenge to manage. As a result, the confidential and proprietary information has become the primary target of malicious actors. Thus, a wide range of security systems have been deployed to safeguard the information and integrity of the network.

The unauthorized or anomalous access to network assets in an organization is commonly approached by using sparse security baselines, behavior outliers, and access controls. Typically, unauthorized access is prevented through access controls. Access controls are enabled by a default behavior of rules to grant access to the community of users within the same network.

In more sophisticated cases, anomaly detection relies on a "supervised" approach that depends on the reliable and accurate classification of a training dataset. More specifically, the determination of anomalous and normal behavior depends on the quality of the classification model based on feature extraction from historical collections of events and metrics. However, the frequency of user interactions renders the supervised approach unsuitable for dynamic environments because the communications among users are continuously evolving and changing.

Other existing systems calculate a statistical baseline value, determine a type of access to the network assets, and detect deviations from the baseline value. However, the likelihood of detecting unauthorized network access is low because the unauthorized network access may be missed because of the long tail of the event logs. Thus, protection mechanisms based on sparse static baselining of user behavior is insufficient to detect internal threats.

The problem with static baselines, access control methods, and supervised anomaly detection includes the lack of support and context for highly dynamic user communities. Also, the static nature of access control methods and supervised anomaly detection present a problem in large networks due to the amount of workforce required to sustain an adequate security posture. Additionally, security monitoring systems are not designed to model and monitor network anomalies of user communities using exchange messages.

Another problem with traditional anomaly detection is the large number of false positives. In this situation, cybersecurity analysts must identify, protect, detect, and respond to a massive number of alerts, events, and metrics on the network including misleading, false positives. Moreover, traditional anomaly detection is inadequate in a growing and dynamic network of users.

It would, therefore, be beneficial to provide flexible security management systems and methods that detect unauthorized access to network assets based on an independent and dynamic set of user parameters or attributes.

SUMMARY

An illustrative system and method for detecting unauthorized access to a plurality of network assets is described. An illustrative first system embodiment includes a first network asset feed, a social graph, user communities, user accounts, other network asset feeds, derived communities and reporting an anomalous communication. The first network asset feed is received from email data sources, and the social graph is generated with the first network asset feed. The social graph is used to identify user communities, and one or more user accounts are associated with a plurality of user communities. Other network asset feeds are accessed by the user accounts. The network assets feeds may be collected from a firewall log, a router log or any combination thereof. One or more derived communities are associated with a commonly accessed network asset. An anomalous communication is reported when the user community communications does not correspond to the derived community.

The first network asset feed may include an email server and an associated email server feed, in which the email server feed is used to generate an email social graph.

In yet another illustrative embodiment, the other network asset feeds may include a firewall and an associated firewall feed, which is used to generate a firewall social graph. Additionally, the firewall feed includes at least one of a normal firewall data set and an anomalous firewall data set.

In a still further embodiment, the illustrative system includes at least one overlapping community, in which each overlapping community includes at least two work groups.

In a yet further embodiment, the one or more derived communities are determined by using one or more traffic patterns corresponding to at least one user community accessing a shared network asset.

In another embodiment, the system further includes an anomalous activity indicative of an attempt to have unauthorized access to at least one network asset, when the user community does not correspond to the derived community.

Another illustrative system for detecting unauthorized access to a plurality of network assets is also described. The other illustrative system includes a first network asset feed received from a plurality of data sources. The first network asset feed is communicated to an anomaly detection module. The social graph is generated with the first network asset feed. The social graph is generated at the anomaly detection module. User communities are identified within the social graph, and each user community is associated with a work group. User accounts are associated with user communities at the anomaly detection module. Other network asset feeds are accessed by the user accounts from at least one of a firewall log and a router log. One or more derived communities are associated with a commonly accessed network asset. The derived communities are determined by using one or more traffic patterns corresponding to at least one user community accessing a shared network asset. An anomalous communication is reported when the user community communications does not correspond to the derived community. The anomaly detection module is configured to monitor communications of the user community so that the communications correspond to the derived community.

A method for detecting unauthorized access to a plurality of network assets is also described. The method includes receiving a first network asset feed from a plurality of data sources, wherein the first network asset feed is communicated to an anomaly detection module. The method then proceeds to generate at least one social graph with the first network asset feed at the anomaly detection module. User communities are identified with the social graph at the anomaly detection module. Each user community is associated with a work group. Additionally, one or more user accounts are associated with a plurality of user communities at the anomaly detection module. The method proceeds to receive other network asset feeds that are accessed by the user accounts from a firewall log, a router log or a combination thereof. One or more derived communities is then determined. Each derived community is associated with a commonly accessed network asset. The anomaly detection module monitors communications of the user community so that the communications correspond to the derived community. An anomalous communication is reported when the user community communications does not correspond to the derived community.

DRAWINGS

The present subject matter will be more fully understood by reference to the following drawings which are presented for illustrative, not limiting, purposes.

DESCRIPTION

Persons of ordinary skill in the art will realize that the following description is illustrative and not in any way limiting. Other embodiments of the claimed subject matter will readily suggest themselves to such skilled persons having the benefit of this disclosure. It shall be appreciated by those of ordinary skill in the art that the systems and methods described herein may vary as to configuration and as to details. Additionally, the methods may vary as to details, order of the actions, or other variations without departing from the illustrative methods disclosed herein.

The system and method presented herein overcome the limitations of anomaly detection based on sparse security baselines, behavior outliers, and access controls. Additionally, the systems and methods presented herein identify unauthorized access to network assets based on anomaly detection associated with communities. Furthermore, the systems and methods described herein provide a dynamic system and method to identify, detect, and report unauthorized access to network assets.

Traditionally, static lists of team members and network assets are maintained through dispersed polling methods such as site surveys. The anomaly detection system and method described herein operates using work groups, e.g., department, project, and teams, to dynamically identify user communities and derived communities. Additionally, machine learning algorithms are used to continuously add new users, update existing users, and remove users leaving the network.

In general, a system and method for detecting unauthorized access to a plurality of network assets is described. The system and method receive a network asset feed from a data source and then generating at least one social graph. User communities are identified with the social graph and user accounts are associated with user communities. Commonly accessed network assets are identified from a firewall log, a router log or other such logged data sets that identify the user accounts accessing the network assets.

A derived community is identified based on the user accounts associated with commonly accessed network assets. The systems and methods described herein monitor communications associated with the user community so that the communications correspond to the derived community, and then reports an anomalous communication when the user community communications do not correspond to the derived community.

In the systems and methods described herein, a single user may belong to multiple work groups including but not limited to multiple geographical locations, departments, projects, teams, newsletters, and affiliations.

Social graphs are used to identify user communities. The social graph is used to depict relationships between users. The social graph is used to provide a mapping of users and how the users are related.

By way of example and not of limitation, social graphs as presented herein may be designed with relevant features from email communications. More specifically, email communications are used to generate a social graph, which is then used to identify the user communities. Additionally, social graphs may be used to measure the relative distances between users of a community.

User communities may be representative of corporate departments and work groups. User communities are dynamically and regularly updated to overcome the limitations of sparse static anomaly detection.

Derived communities are based on user accounts accessing at least one common or shared network assets. Thus, user communities may be used in combination with network access patterns to construct the derived communities as probabilistic models of network access.

Anomalous traffic is considered as an exchange of information with servers outside the derived community. Also, anomalous behavior is different from normal user behavior associated with a derived community.

Figure 1:
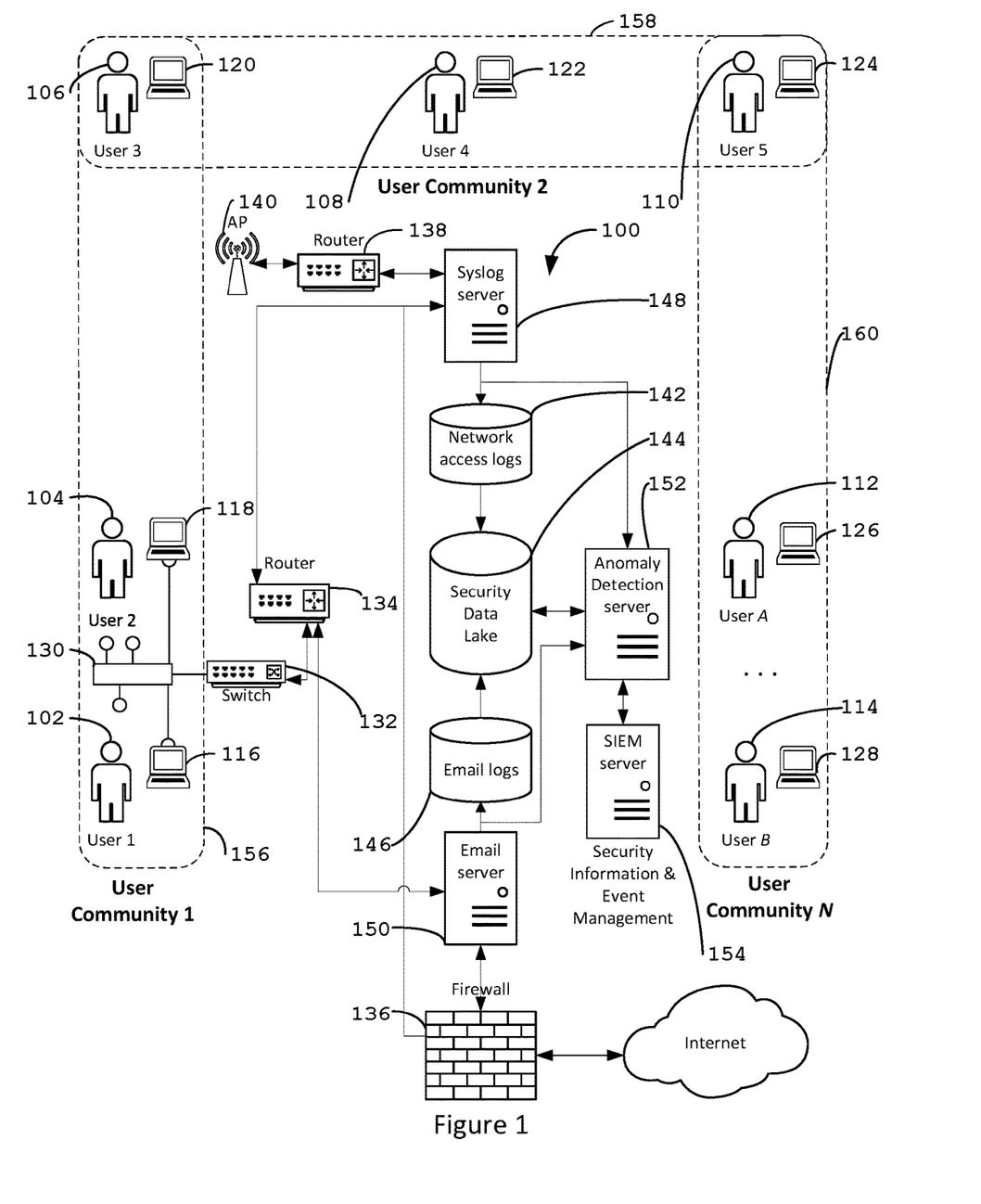
FIG. 1 shows an on-premise network architecture for anomaly detection of unauthorized access to network assets.

Referring to FIG. 1 there is shown an on-premise system 100 for anomaly detection of unauthorized access to network assets. The on-premises system 100 relies on an on-premises architecture that is accessed by a plurality of user communities. The illustrative users are employees. By way of example and not of limitation, each of the users 102, 104, 106, 108, 110, 112, and 114 interacts with computing devices 116, 118, 120, 122, 124, 126, and 128, respectively.

Each of the computing devices 116, 118, 120, 122, 124, 126, and 128 is connected to a network, which in the illustrative embodiment has the ability to send emails through monitored network devices. Note, that terms such as "network devices" may also be referred to interchangeably as "network assets."

With respect to information security, computer security, and network security, an "asset" is any data, device, or other component of the environment that supports information-related activities.

For example, the network assets may include wired network assets and wireless network assets. The illustrative wired network assets include physical mediums of transmission 130 such as fiber optic cable or ethernet cable. Additionally, the illustrative wired network assets include any network asset capable of establishing and terminating logical links between clients such as switch 132, router 134, and firewall 136.

Additionally, the wireless network assets include a plurality of computing devices capable of supporting wireless protocols, e.g., 802.11 a/n/ac and 802.11 ad, in the 2.4, 5.0, and 60 GHz wireless range. An illustrative wireless router 138 with an Access Point (AP) 140 is typically employed to provide wireless access to authorized users on a corporate network.

Network logs may be generated by the network assets. For example, the network logs from switches 132, routers 134 and 138, and firewalls 136 are collected by storage repositories 142, 144, and 146, which are capable of storing large amounts of raw data. With respect to the illustrative firewall 136, the firewall may be configured to operate as an appliance capable of packet filtering, deep packet inspection (DPI), and intrusion detection system (IDS).

A computing unit defined as syslog server 148 process event messages from network devices. Also, an email server 150, used to send and receive email, can support transmission protocols such as Simple Mail Transfer Protocol (SMTP) and incoming protocols such as Internet Message Access Protocol (IMAP) and Post Office Protocol (POP3). Equally important, the network access logs 142 and email logs 146 are a component of a security data lake 144.

An anomaly detection server 152 employs a plurality of security data sources including but not limited to network access logs 142 and email logs 146 for detection of unauthorized access to network assets. The anomaly detection server 152 includes an anomaly detection module as described in further detail in FIG. 4. Additionally, an illustrative Security Information and Event Management (SIEM) server 154 provides real-time metrics, events, and alerts reported by the anomaly detection server 152.

In operation, the illustrative on-premises system 100 includes a first network asset feed received from a plurality of data sources. The first network asset feed is communicated to an anomaly detection module, which is associated with anomaly detection server 152. The social graph is generated with the first network asset feed at the anomaly detection module 406 (shown in FIG. 4). The first network asset feed may include an email server and an associated email server feed, in which the email server feed is used to generate an email social graph.

The illustrative anomaly detection server 152 is configured to identify the user communities with the social graph, and each user community is associated with a work group. Additionally, user accounts are associated with user communities at the anomaly detection module 406.

Other network asset feeds are accessed by the user accounts from at least one of a firewall log and a router log. One or more derived communities are associated with a commonly accessed network asset. Additionally, the one or more derived communities are determined by using one or more traffic patterns corresponding to at least one user community accessing a shared network asset.

In the illustrative embodiment, the derived communities are determined by using one or more traffic patterns corresponding to at least one user community accessing a shared network asset. The other network asset feeds may include a firewall and an associated firewall feed, which is used to generate a firewall social graph. Additionally, the firewall feed includes at least one of a normal firewall data set and an anomalous firewall data set.

The anomaly detection server 152 reports an anomalous communication when the user community communications does not correspond to the derived community. In the illustrative embodiment, the anomaly detection module 406 is configured to monitor communications of the user community so that the communications correspond to the derived community. The system 100 may further include an anomalous activity indicative of an attempt to have unauthorized access to at least one network asset when the user community does not correspond to the derived community.

An illustrative first user community 156 is shown that includes users 102, 104, and 106. A second user community 158 includes users 106, 108, and 110. An illustrative "N" community 160 is also shown, which includes users 110, 112, and 114. In the illustrative system, users 106 and 110 belong to overlapping community, in which each overlapping community includes at least two work groups.

Figure 2A:
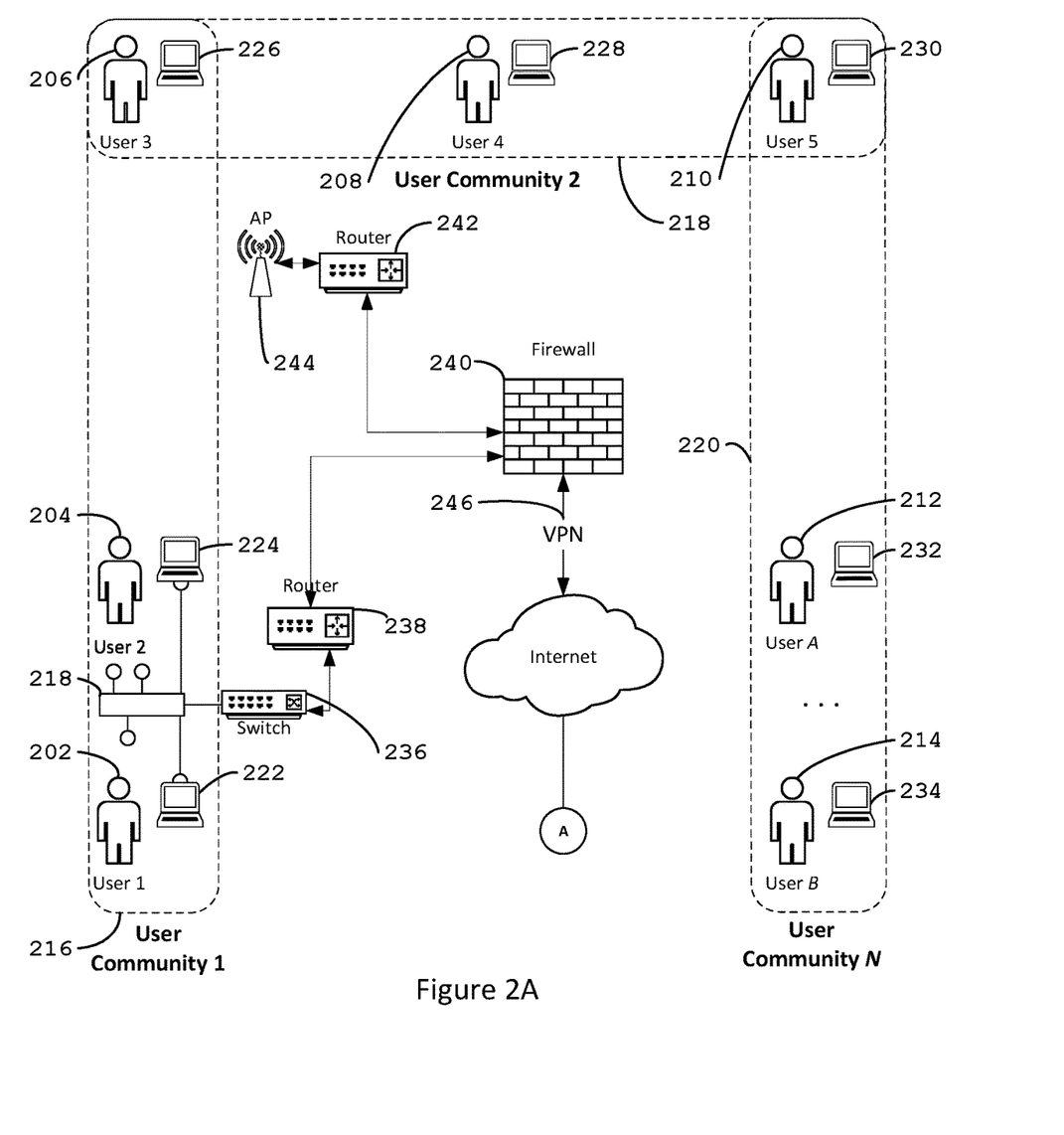
FIG. 2A and FIG. 2B show a network architecture based on cloud computing services for anomaly detection of unauthorized access to network assets.
Figure 2B:
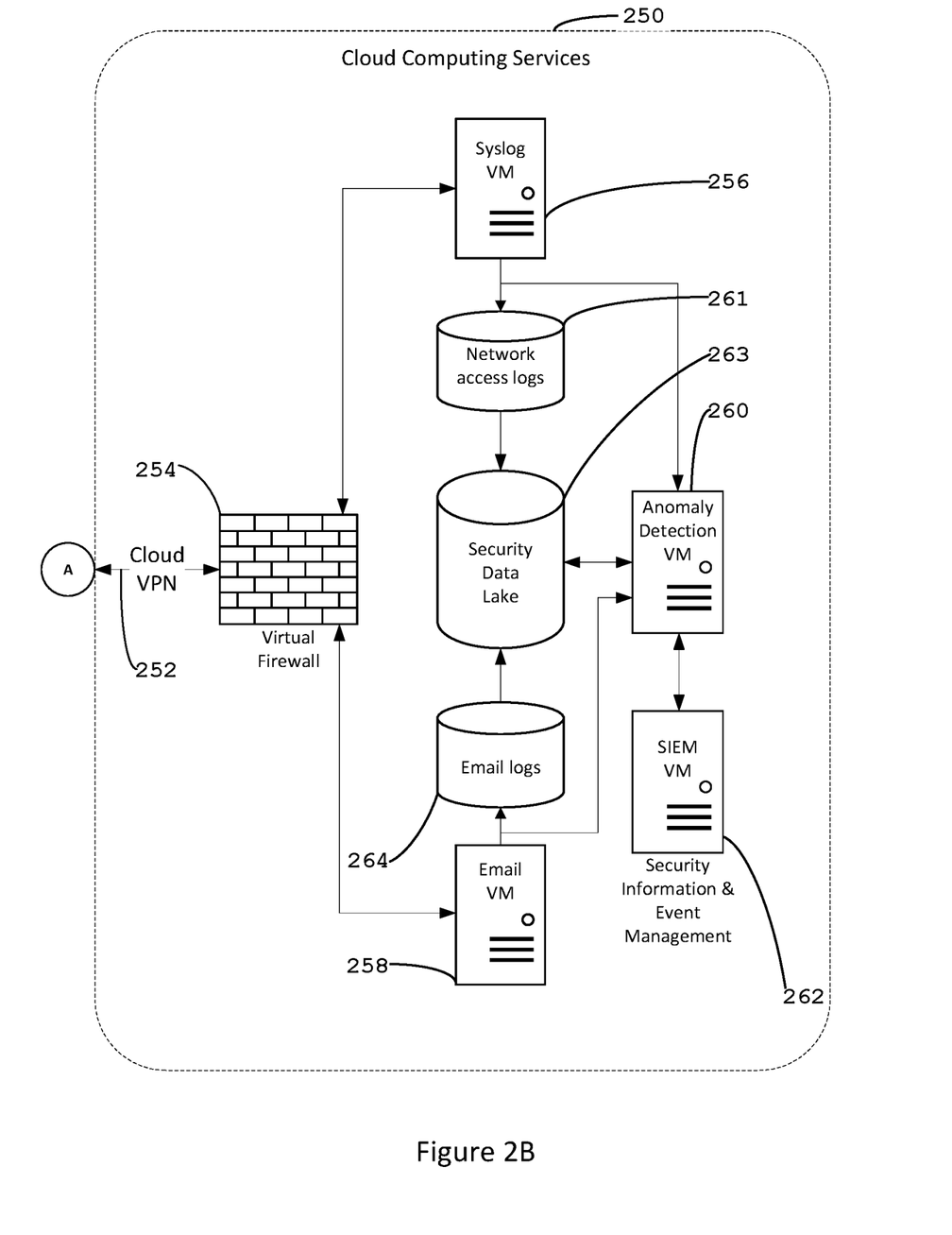

Referring to FIG. 2A and FIG. 2B, there is shown a system for anomaly detection using cloud computing services. Although, the user communities and network devices operate in a manner similar to the elements shown in FIG. 1, the detection of unauthorized access to network assets is performed remotely as described below.

In FIG. 2A, a plurality of user communities are shown that include users, e.g., employees, such as users 202, 204, 206, 208, 210, 212, and 214. The user communities include a first user community 216 that includes users 202, 204, and 206. The second user community 218 includes users 206, 208, and 210. The "N" user community 220 includes users 210, 212, and 214. The users 202, 204, 206, 208, 210, 212, and 214 also interact with computing devices 222, 224, 226, 228, 230, 232, and 234, respectively.

The network assets include wired network assets and wireless network assets such as wired network assets that include switch 236, router 238, and firewall 240. The wireless network assets include wireless router 242 with an Access Point (AP) 244. In a distributed system embodiment, a network of remote users, regional offices, and head offices are connected through a Virtual Private Network (VPN) 246 such as cloud-based VPN technologies.

Referring now to FIG. 2B, there is shown an illustrative cloud computing system 250. The cloud computing service includes the cloud-based VPN 252 and virtual firewall 254. The virtual firewall 254 includes a virtualized service offering packet filtering, deep packet inspection (DPI), and intrusion detection system (IDS). In addition, a security data lake 263 is used to store large amounts of raw data of network access logs 261, email logs 264, and other network asset feeds.

Additionally, a plurality of virtual machines (VMs) may be hosted on a cloud computing environment. The VMs may provide a platform for logging protocols 256, email services 258, anomaly detection 260, and security information and event management (SIEM) 262. Furthermore, the system 250 may include other VMs (not shown) that provide services, which include feature extraction, access patterns, and classification and clustering of user and derived communities for network anomaly detection.

The illustrative cloud system 250 of FIG. 2B may be embodied as one of four fundamental cloud service models, namely, infrastructure as a service (IaaS), platform as a service (PaaS), software as a service (SaaS), and network as a service (NaaS). The cloud service models are deployed using different types of cloud deployments that include a public cloud, a community cloud, a hybrid cloud, and a private cloud.

In the illustrative embodiments presented in FIGS. 1, 2A, and 2B, the email fields may be used to develop user communities. The email fields may include content, timestamp, client IP, client hostname, server IP, server hostname, source context, connector identifier, message tracking events (ADMIN, AGENT, DSN, GATEWAY, PICKUP, ROUTING, SMTP, STOREDRIVER), event identifier, internal message identifier, message identifier, recipient addresses, recipient status, message total bytes, recipient count, related recipient addresses, type of event (DSN, SEND, TRANSFER), message subject, sender address, return email address, and other message information.

Referring now to FIGS. 2A and 2B, the users 202, 204, 206, 208, 210, 212, and 214 in a community are continuously monitored for internal network access of assets. For instance, network services provided to users are logged from devices including, but not limited to, switches 236, routers 238 and 242, access points 244, and firewalls 240.

By way of example and not of limitation, standard fields provided by next-generation firewalls 240 are the server name, timestamp, transport protocol, client IP and port, destination IP and port, original client IP, source network, destination network, type of action, error codes, active firewall rule, application protocol, bidirectional communication flag, bytes sent, bytes received, processing time, destination hostname, client username, client agent, session identifier, connection identifier, network interface, raw IP header, raw payload, NAT address, and other vendor-specific fields.

In the illustrative embodiment, one or more social graphs are dynamically generated using the email features reported by an email server 258 and email logs 264. A fundamental premise in the use of emails relates to the exchange of emails among users of a network is representative of the emails to represent dialogues and conversations.

More specifically, the systems and methods described herein generate a social graph of users 202, 204, 206, 208, 210, 212, and 214 based on email communications including logs and metadata. The illustrative social graph is used to generate user communities that are representative of the work groups, e.g., departments.

Figure 3:
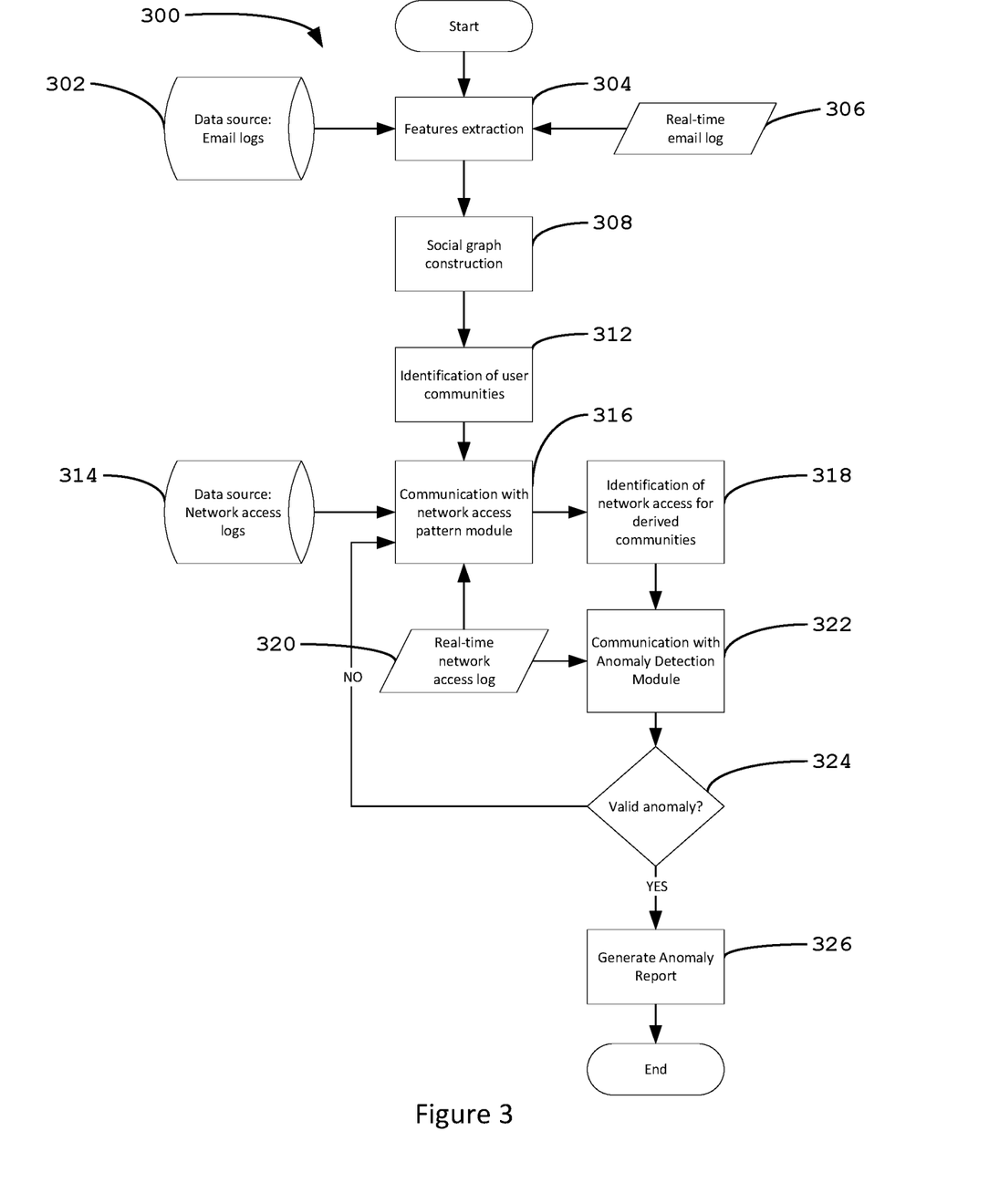
FIG. 3 shows an illustrative flowchart of detection of unauthorized access to network assets.

Referring now to FIG. 3, there is shown an illustrative flowchart 300 of the method for anomaly detection with associated communities. The method described in FIG. 3 represents an illustrative flow for feature extraction, network pattern access, network classification, identifying of user communities, and identifying of derived communities for anomaly detection. Additionally, the illustrative method relies on the systems described above, which includes a plurality of data sources, email servers, and network devices.

In the illustrative method 300, a data source 302 that includes a historical email log is accessed. At block 304, feature extraction from email logs 302 determines the model constructs and baselining for the generation of the social graphs, which is performed at block 308. Additionally, the feature extraction process may be performed for real-time information that is generated by a real-time email log 306.

The method then proceeds to block 308 where the social graph is constructed. After the social graph is constructed, the method proceeds to block 312 where the user communities are generated. The social graphs 308 are designed to support the generation of user communities.

The method then proceeds to block 316 where a plurality of data sets are received by an illustrative network access pattern module. By way of example and not of limitation, the network access pattern module receives historical network access logs from data source 314 and real-time network access logs 320. The illustrative network access pattern module identifies network access patterns.

The method then proceeds to block 318 where derived communities are identified. In the illustrative embodiments, the network access pattern module associated with block 316 may be configured to perform classification and clustering operations, which are then used to identify the network access for derived communities that are identified in block 318.

By way of example and not of limitation, the access pattern of each user community is used to calculate the network activity of derived communities. Therefore, the process is referred as the generation of network access for derived communities. Moreover, regular communications of a user community would agree with a corresponding derived community.

In the illustrative embodiment, a mixed method of hierarchical and non-hierarchical clustering methods may be used to identify derive communities based on network access patterns for each user community. Similarities among users may be defined in terms of access patterns for each derived community. Users from different derived communities represent unrelated network access patterns.

Figure 4:
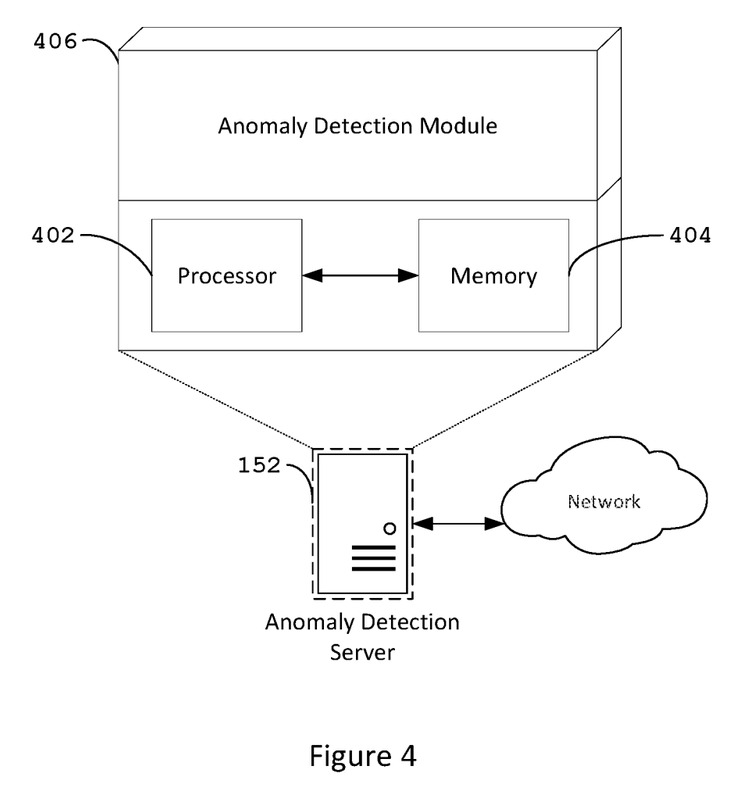
FIG. 4 shows an illustrative anomaly detection server.

The method then proceeds to block 322 where a variety of different data sets are communicated to an illustrative anomaly detection module. The illustrative anomaly detection module 406 is associated with anomaly detection server 152, anomaly detection VM 260, anomaly detection module 406 or any combination thereof. In the illustrative embodiment, the anomaly detection module receives real-time network access log data from block 320 and the derived community data sets from block 318. The anomaly detection module may then proceed to calculate a deviation from the dynamically updated baseline of derived communities 318.

A baseline for derived communities may be associated with normal network access pattern, which may be defined as a regular communication within a user community that determined by the interfaces, functions, and context of the corresponding derived community.

At decision diamond 324, an anomaly may be detected by the anomaly detection module. If an illustrative anomaly is not detected, the method may return to block 316. However, if an anomaly is detected, the method proceeds to block 326 where an anomaly report 326 is generated. The anomaly report may be communicated to the illustrative Security Information and Event Management (SIEM) server 154.

By way of example and not of limitation, a machine learning algorithm with reinforced learning may be used to report anomalous access with high confidence. As a result, an anomalous report is triggered by traffic from a user that is exchanged with servers outside the corresponding derived community.

In operation, the source feeds used for feature extraction and dynamic analysis include email logs 302 and network access logs 314. In the illustrative embodiment, the illustrative email servers 150 and 258 are used to build a social graph between users. The social graph is used to classify user communities that are representative of respective departments and work groups. The derived communities are generated with network feeds collected by syslog services 148 and 256. More specifically, the syslog services 148 and 256 are used for building derived communities based on user community's access patterns and tagging of network traffic.

Referring to FIG. 4, there is shown an illustrative anomaly detection server 152 that includes a processor 402 and a memory 404. Additionally, the anomaly detection server includes an anomaly detection module 406. The anomaly detection server is communicatively coupled to the network as described above. For the cloud service embodiment, the anomaly detection server may be embodied as a Virtual Machine (VM) that is running on a processor and memory (not shown).

A system and method for detecting unauthorized access to network assets is described above. The unauthorized access is determined with anomaly detection corresponding to user communities and derived communities. User communities are representative of corporate departments and work groups. Social graphs are designed with relevant features from email communication to create user communities. Derived communities are based on community access to network assets. The systems and methods described above provide a system for detection of single access to a network asset outside the allocated network assets for a user. Otherwise, the single access would have been lost in the tail of event logs.

It is to be understood that the detailed description of illustrative embodiments is provided for illustrative purposes. The scope of the claims is not limited to these specific embodiments or examples. Therefore, various process limitations, elements, details, and uses can differ from those just described, or be expanded on or implemented using technologies not yet commercially viable, and yet still be within the inventive concepts of the present disclosure. The scope of the invention is determined by the following claims and their legal equivalents.

What is claimed is:

1. A system for detecting unauthorized access to a plurality of network assets, the system comprising:
   an anomaly detection server including a processor and a memory;
   a first network asset feed received by the anomaly detection server from a plurality of email data sources;
   at least one social graph generated by the anomaly detection server with the first network asset feed;
   a plurality of user communities that are identified with the social graph;
   a plurality of user community communications, wherein each communication of the plurality of user community communications associated with at least one of the plurality of user communities;
   one or more user accounts associated with the plurality of user communities;
   a plurality of other network asset feeds that are accessed by the one or more user accounts from at least one of a firewall log and a router log, wherein the plurality of other network asset feeds include,
   a firewall and an associated firewall feed, and
   a firewall social graph with the firewall feed;
   one or more derived communities are associated with a commonly accessed network asset; and
   an anomalous communication reported by the anomaly detection server when one of the plurality of user community communications does not correspond to the one or more derived communities.

2. The system of claim 1 wherein the email data sources include,
   an email server and an associated email server feed, and
   an email social graph generated with the email server feed.

3. The system of claim 1 wherein the firewall feed includes at least one of a normal firewall data set and an anomalous firewall data set.

4. The system of claim 1 further comprising at least one overlapping community, in which each overlapping community includes at least two work groups.

5. The system of claim 1 wherein the one or more derived communities is determined by using one or more traffic patterns corresponding to at least one user community accessing a shared network asset.

6. The system of claim 1 further comprising an anomalous activity indicative of an attempt to have unauthorized access to at least one network asset, when one user community of the plurality of user communities does not correspond to at least one derived community of the one or more derived communities.

7. A system for detecting unauthorized access to a plurality of network assets, the system comprising:
   an anomaly detection server including a processor and a memory;
   a first network asset feed received by the anomaly detection server from a plurality of data sources, wherein the first network asset feed is communicated to an anomaly detection module;
   at least one social graph generated by the anomaly detection server with the first network asset feed, wherein the social graph is generated at the anomaly detection module;
   a plurality of user communities that are identified with the social graph, in which each user community is associated with a work group;
   a plurality of user community communications, wherein each communication of the plurality of user community communications associated with at least one of the plurality of user communities;
   one or more user accounts associated with the plurality of user communities at the anomaly detection module;
   a plurality of other network asset feeds that are accessed by the one or more user accounts from at least one of a firewall log and a router log, wherein the plurality of other network asset feeds include,
   a firewall and an associated firewall feed, and
   a firewall social graph with the firewall feed;
   one or more derived communities are associated with a commonly accessed network asset, wherein the one or more derived communities is determined by using one or more traffic patterns corresponding to at least one user community accessing a shared network asset;
   an anomalous communication reported when one of the plurality of user community communications does not correspond to the one or more derived communities; and
   wherein the anomaly detection module is configured to monitor communications of the user community so that the communications correspond to the derived community.

8. The system of claim 7 wherein the first network asset feed includes,
   an email server and an associated email server, and
   an email social graph generated with the email server feed.

9. The system of claim 7 wherein the firewall feed includes at least one of a normal firewall data set and an anomalous firewall data set.

10. The system of claim 7 further comprising at least one overlapping community, in which each overlapping community includes at least two work groups.

11. The system of claim 7 further comprising an anomalous activity indicative of an attempt to have unauthorized access to at least one network asset, when one user community of the plurality of user communities does not correspond to at least one derived community of the one or more derived communities.

12. A method for detecting unauthorized access to a plurality of network assets, the method comprising:
- receiving a first network asset feed from a plurality of data sources, wherein the first network asset feed is communicated to an anomaly detection module;
- generating, at the anomaly detection module, at least one social graph with the first network asset feed;
- identifying, at the anomaly detection module, a plurality of user communities with the social graph, in which each user community is associated with a work group wherein each user community of the plurality of user communities includes at least one user community communication of a plurality of user community communications;
- associating, at the anomaly detection module, one or more user accounts with the plurality of user communities;
- receiving a plurality of other network asset feeds that are accessed by the one or more user accounts from at least one of a firewall log and a router log, wherein at least one of the plurality of other network asset feeds includes,
  - accessing a firewall and an associated firewall feed, and generating a firewall social graph with the firewall feed;
- determining one or more derived communities, in which each derived community is associated with a commonly accessed network asset;
- monitoring, at the anomaly detection module, the plurality of user community communications for user community communications corresponding to the one or more derived communities; and
- reporting an anomalous communication when one of the monitored user community communications does not correspond to the derived community.

13. The method of claim 12 wherein the first network asset feed includes,
- accessing an email server and an associated email server feed; and
- generating an email social graph with the email server feed.

14. The method of claim 12 further comprising tagging the firewall feed as having at least one of a normal firewall data set and an anomalous firewall data set.

15. The method of claim 12 further comprising identifying at least one overlapping community, in which each overlapping community includes at least two work groups.

16. The method of claim 12 wherein the determining of one or more derived communities is performed by using one or more traffic patterns corresponding to at least one user community accessing a shared network asset.

17. The method of claim 12 further comprising identifying an anomalous activity indicative of an attempt to have unauthorized access to at least one network asset, when one user community of the plurality of user communities does not correspond to at least one derived community of the one or more derived communities.

* * * * *